United States Patent
Favret et al.

(10) Patent No.: US 7,092,824 B2
(45) Date of Patent: Aug. 15, 2006

(54) METHODS AND SYSTEMS FOR INTERACTIVE INVESTIGATION OF GEOPHYSICAL DATA

(75) Inventors: Paul Favret, Littleton, CO (US); Richard Foy, Denver, CO (US)

(73) Assignee: Ascend Geo LLP, Denver, CO (US)

( * ) Notice: Subject to any disclaimer, the term of this patent is extended or adjusted under 35 U.S.C. 154(b) by 167 days.

(21) Appl. No.: 10/690,481

(22) Filed: Oct. 20, 2003

(65) Prior Publication Data
US 2005/0086006 A1 Apr. 21, 2005

(51) Int. Cl.
G01V 1/00 (2006.01)
G06F 19/00 (2006.01)

(52) U.S. Cl. .................................. 702/14; 702/1
(58) Field of Classification Search ............. 702/1–18; 367/77; 340/870.13; 703/5, 10
See application file for complete search history.

(56) References Cited

U.S. PATENT DOCUMENTS

| | | | |
|---|---|---|---|
| 3,806,864 A | 4/1974 | Broding et al. ............... 367/77 |
| 4,017,833 A | 4/1977 | Broding ........................ 367/77 |
| 4,639,901 A | 1/1987 | Warmack et al. ............. 367/13 |
| 4,885,724 A | 12/1989 | Read et al. .................... 367/77 |
| 5,251,184 A * | 10/1993 | Hildebrand et al. .......... 367/72 |
| 5,563,949 A * | 10/1996 | Bahorich et al. ............. 702/16 |
| 5,724,307 A * | 3/1998 | Gaiser ........................... 367/21 |
| 5,724,309 A | 3/1998 | Higgs et al. .................. 367/48 |
| 5,831,935 A | 11/1998 | Luo et al. ...................... 367/47 |
| 5,838,564 A | 11/1998 | Bahorich et al. ............. 702/16 |
| 5,873,051 A | 2/1999 | Van Bemmel et al. ........ 702/17 |
| 5,930,730 A | 7/1999 | Marfurt et al. ............... 702/16 |
| 5,940,778 A | 8/1999 | Marfurt et al. ............... 702/16 |
| 5,986,974 A | 11/1999 | Luo et al. ...................... 367/41 |
| 5,995,907 A * | 11/1999 | Van Bemmel et al. ........ 702/16 |
| 6,092,026 A * | 7/2000 | Bahorich et al. ............. 702/16 |
| 6,138,075 A | 10/2000 | Yost ............................... 702/14 |
| 6,141,622 A | 10/2000 | Keller et al. .................. 702/16 |
| 6,278,949 B1 * | 8/2001 | Alam ............................ 702/16 |
| 6,317,384 B1 | 11/2001 | Luo et al. ...................... 367/47 |
| 6,337,636 B1 | 1/2002 | Page et al. ............. 340/870.13 |
| 6,526,353 B1 | 2/2003 | Wallet et al. .................. 702/11 |
| 6,640,190 B1 * | 10/2003 | Nickel ........................... 702/14 |

* cited by examiner

*Primary Examiner*—John Barlow
*Assistant Examiner*—Victor J. Taylor
(74) *Attorney, Agent, or Firm*—Townsend and Townsend and Crew LLP

(57) ABSTRACT

Methods and systems are provided for investigating an image set of geophysical data distributed over a first N-dimensional volume where $N \geq 2$. A subvolume that encloses a known feature of interest within a target set of geophysical data distributed over a second N-dimensional volume is selected. A cross-correlation is calculated between the data distributed within the subvolume and corresponding data distributed in the first N-dimensional volume about multiple positions.

25 Claims, 3 Drawing Sheets

METHODS AND SYSTEMS FOR INTERACTIVE INVESTIGATION OF GEOPHYSICAL DATA

BACKGROUND OF THE INVENTION

This application relates generally to analysis of geophysical data. More specifically, this application relates to methods and systems that use cross-correlation techniques in the analysis of geophysical data.

There are a number of applications in which it is desirable to identify geological structures. For example, in many instances, the presence of subsurface geological structures such as faults or other stratigraphic features may be used in identifying locations of hydrocarbon reservoirs so that drilling sites may be specified. Typically, the identification of geological structures begins with the collection of geophysical data, which may be in the form of seismic or other types of geophysical data. For example, seismic data may be collected by distributing acoustic sources at an area and using the sources to synthesize physical shock waves that reflect off rock strata at variable velocities and return to the surface. Geophones at the surface measure and record ground motion to define a seismic response in the form of a data set.

The collected data are subsequently analyzed, with the reliability of interpretations made from the data being very much tied to the manner of analysis. There have accordingly been a significant number of attempts to develop reliable analytical techniques for geophysical data that have good predictive power. Many of these approaches are based on pattern-recognition techniques and may incorporate various artificial-intelligence techniques such as neural nets, experts systems, genetic algorithms, and the like. A common feature of these techniques is that they attempt to identify some attribute that may be extracted from the data and to which the pattern-recognition approaches may be applied. These techniques accordingly require a relatively high level of user input in their execution and, in practice, their reliability has tended to be disappointing. A basic deficiency of all such techniques is their dependence on identifying an attribute that may be extracted from the data that provides a parameter set having suitably predictive power; the ability to do so has been constrained by the variation and complexity of data that arise from diverse real-world applications.

There is accordingly a general need in the art for improved methods and systems for analyzing geophysical data.

BRIEF SUMMARY OF THE INVENTION

Embodiments of the invention make use of a technique that calculates cross-correlations based on underlying data without attempting to identify specific attributes indicative of certain features. A method is thus provided for investigating an image set of geophysical data distributed over a first N-dimensional volume where $N \geq 2$. The method makes use of a known feature of interest within a target set of geophysical data distributed over a second N-dimensional volume. A subvolume that encloses the known feature of interest is selected. At each of a plurality of positions within the first N-dimensional volume a cross-correlation is calculated between the data distributed within the subvolume and corresponding data distributed in the first N-dimensional volume about the position.

In some instances, a distribution of results of the cross-correlation calculation may be displayed for a user. The subvolume may be modified in accordance with a user instruction, with the cross-correlation calculations being repeated at each of a plurality of positions within the first N-dimensional volume using the modified subvolume. The subvolume may be modified by changing a size of the subvolume a by changing a shape of the subvolume. In some embodiments, each of the image set and the target set consists of real data. The cross-correlation may be calculated from such real data as a real cross-correlation. Alternatively, the real data of the image and target sets may respectively be transformed to complex data by performing a Hilbert transform of the real data, with the cross-correlation being calculated as a complex cross-correlation. Such a complex cross-correlation permits calculation of an amplitude envelope and phase distribution over the first N-dimensional volume. In some cases, the data distributed within the subvolume may be normalized over the subvolume prior to calculating the cross-correlation.

The image and target sets may comprise seismic data or may comprise mathematical transforms of seismic data in different embodiments. In one embodiment, the image set is the target set. Also, the subvolume may take a variety of different shapes in different embodiments, including the shape of a parallelepiped in one embodiment.

The methods of the invention may be embodied in a computer-readable storage medium having a computer-readable program for directing operation of a computer system. The computer system may include an input device, a processor, and a display device. The computer-readable program includes instructions for operating the computer system to investigate geophysical data in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Embodiments of the invention derive from a recognition by the inventors that many of the prior-art analytical techniques used in the evaluation of geophysical data rely on attempts to identify statistical reorganizations of underlying data that have good predictive value. Rather than engage in the difficulties that are necessarily associated with making such identifications, embodiments of the invention instead avoid the entire question of which statistical reorganization to choose by relying on the underlying data itself. Essentially, embodiments of the invention use a mapping of cross-correlation values to identify regions within a volume of data that are similar to data known to include a feature of interest. This method imposes no predetermined expectation that any specific statistical reorganization of the data is more or less likely to identify features of interest. Instead, the method simply looks for regions of data that have similar characteristics to what is desired, without ever needing to specify what those characteristics are. In this way, multiple characteristics or attributes are accommodated automatically. Fundamentally, everything that is known about the data is embodied by the basic data itself; it is tautological that no particular statistical reorganization can ever provide more information than is inherent in the underlying data itself. Advantageously, the methods of the invention may greatly simplify data analysis by having an operator merely examine a display to identify high-amplitude events.

Figure 1A:
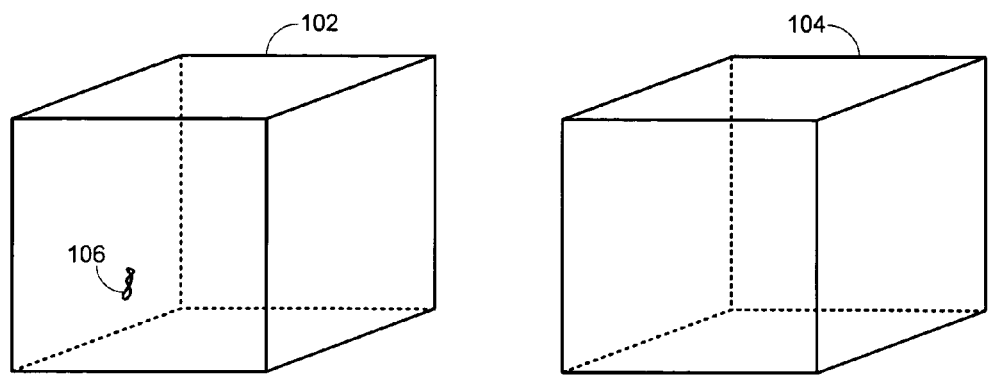
FIGS. 1A–1C provide schematic diagrams of data sets used in illustrating embodiments of the invention conceptually.
Figure 1B:
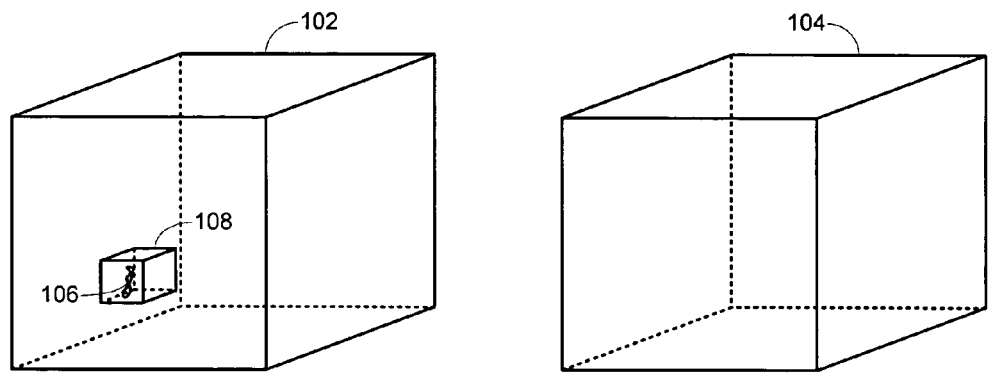
Figure 1C:
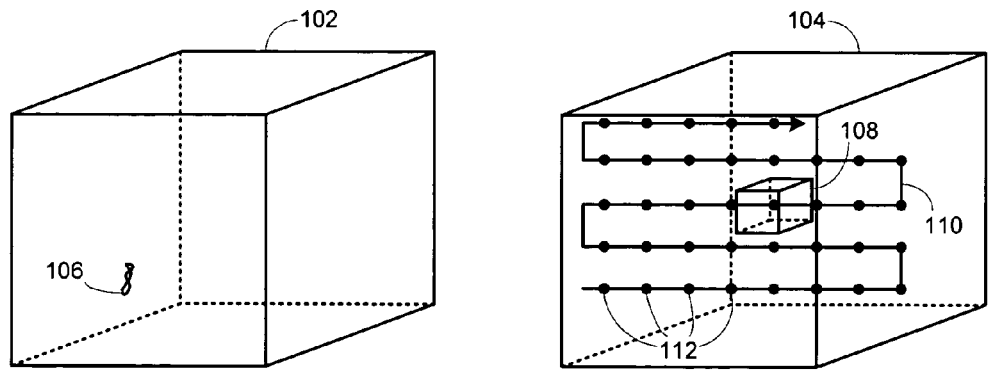

An overview of methods for investigating geophysical data is shown schematically in FIGS. 1A–1C. As used herein, the term "geophysical data" is intended to refer to any data derived from measurements of the Earth. In some instances, such geophysical data may comprise seismic data, which are derived from acoustic signals propagated through the Earth, but may alternatively encompass magnetic data, electromagnetic data, gravimetric data, and the like. Furthermore, the geophysical data may comprise raw field recordings or may comprise data that have been preprocessed using known techniques such as stacking, migration, offsetting, and the like. For instance, the geophysical data might comprise prestack data, limited-offset data, migrated poststack data, and the like. Also, the geophysical data may comprise a measured quantity such as amplitude or a derived quantity such as instantaneous phase or frequency.

As shown schematically in FIG. 1, methods in embodiments of the invention make use of a target set of geophysical data 102 and an image set of geophysical data 104. The image set 104 is to be investigated for potential characteristics corresponding to a feature of interest known to be contained in the target set 102. For illustrative purposes, the feature of interest is denoted by reference numeral 106, although it will be appreciated that the feature of interest may not be readily discernible visually from the data within the target set 102. In particular, identification of the feature of interest and its location within the region encompassed by the target set 102 will more usually have been the result of an extensive analysis. Such analysis could include studies performed by a geophysicist or geologist, and may include physical studies of the region such as by drilling in the location of the feature and confirming the presence of a hydrocarbon deposit.

In many instances, the target dataset comprises directly measured data or data derived from direct measurements, but more generally the target dataset may alternatively comprise model data. For example, in one embodiment, the target dataset may comprise synthetic data created using techniques such as wave-equation modeling based an a geophysicist's ideas about what may be in the subsurface or modeling a seismic response based on well data from adjacent regions. Also, a particular example of processed data that may be comprised by the target and image data sets is prestack data. For instance, in a specific embodiment, model prestack data are created containing likely seismic anomalies and the method described below is run on sets of prestack seismic gathers comprised by the image dataset.

It is not necessary that the entire target data set 102 be understood as thoroughly as the portion that contains the feature of interest, although in some instances the entire physical region corresponding to the target data set 102 may have been studied meticulously. For example, in one embodiment, the image data set 104 and the target data set 102 are the same data sets, with methods of the invention being used to investigate the whole data set to identify features similar to the known feature of interest 106. In other embodiments, the image data set 104 and the target data set 102 may be different data sets corresponding to data collected from different physical regions. In such embodiments, knowledge of the existence of the known feature of interest 102 in one physical location is used to investigate a different physical location for the presence of similar features.

While the example shown in FIGS. 1A–1C illustrates an embodiment of the method for three-dimensional image and target data sets 104 and 102, the methods of the invention may be applied more generally to data sets in two or more dimensions. Furthermore, the dimensions need not necessarily correspond exclusively to physical dimensions, although in some embodiments all the dimensions are physical dimensions. For example, data sets in three dimensions may define physical volumes over which data were collected when all three dimensions are physical dimensions; alternatively, data sets in three dimensions might instead define planes over which data were collected at different times when two dimensions are physical dimensions and the third dimension is a time dimension. Similarly, data sets in four dimensions may define physical volumes over which data were collected at different times when three of the dimensions are physical dimensions and one of the dimensions is a time dimension. The use of such time information may be useful, for example, in applications where temporal changes in characteristics are relevant. For example, a feature in a target data set 102 spanning a time dimension may include information on how a geophysical characteristic has changed over time, allowing the image data set 104 to be investigated for geophysical characteristics that show the some type of temporal evolution.

As shown in FIG. 1B, an operator may select a subvolume 108 of the target data set 102 that encloses the known feature of interest 106. As explained in further detail below, in some embodiments this subvolume may undergo modification during the method as part of an interactive component with the operator. There are a variety of ways in which the selection of the subvolume 108 may occur. In one convenient embodiment, such a selection is made by providing a graphical display to the operator, with which the operator may select the subvolume 108 by defining a trace. For instance, in the example where the target data set 102 is a three-dimensional data set, it may be displayed as a three-dimensional volumetric display so that the subvolume 108 may be identified by the operator using a mouse to trace out the subvolume. In other embodiments, other mechanisms may be used to identify subvolumes, such as by having the operator key coordinate information, use voice commands to input coordinate information, and the like.

The target data within the subvolume 108 are then used to calculate a cross-correlation with data in the image data set 104. As shown in FIG. 1C, this is typically done around a plurality of positions 112 within the image data set 104 so that cross-correlation values over a region within the image data set 104 may be determined. The cross-correlation values provide an indication of how similar a corresponding subvolume within the image data set 104 is to the selected subvolume 108 from the target data set 102. As described further below, it may be desirable at different stages in the method only to calculate cross-correlation values for a subset of the image data set 104. For example, FIG. 1C illustrates an example in which the plurality of positions 112 around which the cross-correlations are performed is reached with trace 110 that maps out a plane within the image data set 104. At other stages or in other embodiments, a trace may be used that maps through the entire image data set 104.

While the example of FIGS. 1A–1C shows the image data set 104, the target data set 102, and the subvolume 108 as rectangular parallelepipeds, there is no requirement that they take on these shapes. While the use of parallelepipeds is convenient for certain types of geophysical data acquisition, the method may more generally accommodate any shapes, including ellipsoids, spheres, and the like in three dimensions, or their counterparts in other dimensions.

Figure 2:
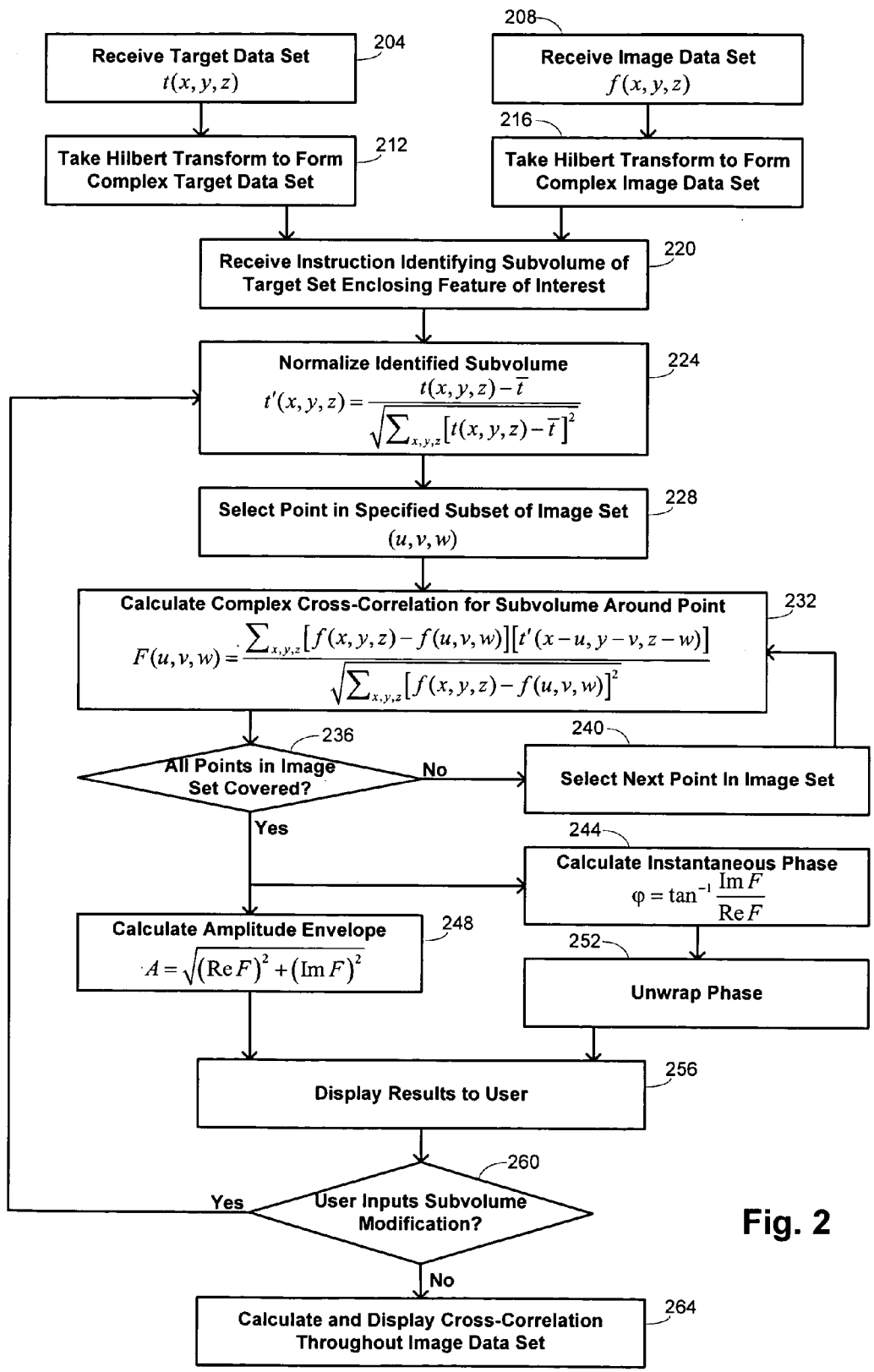
FIG. 2 provides a flow diagram summarizing methods of the invention in various embodiments.

While the sequence in FIGS. 1A–1C provides an overview of embodiments of the invention, a more detailed description is now made in connection with the flow diagram provided in FIG. 2. While this flow diagram sets forth a certain sequence of operations, it should be understood that neither this sequence nor the specific operations shown is necessarily required. In alternative embodiments, some of the operations may be omitted, other operations may be performed, and/or some of the illustrated operations may be performed simultaneously or in a different order than that shown. Furthermore, while the equations set forth in the description of FIG. 2 provide examples where the target data set 102, image data set 104, and subvolume 108 are three-dimensional, their counterparts for applications in other dimensions will be evident to those of skill in the art.

At block 204, the target data set 102 is received and is denoted t(x, y, z) over coordinates (x, y, z). Similarly, at block 208, the image data set 104 is received and is denoted f(x, y, z). The target and image data sets may consist of real data, where "real data" refers to data having no imaginary component. While in some embodiments, the calculation of the cross-correlation may be performed directly with such real data, more useful information may be obtained by transforming such real data to complex data by performing a Hilbert transform. The use of complex data advantageously provides a full measure of waveform relationships and, as such, permits subsequent calculation of a complex cross-correlation to allow the extraction of both an amplitude envelope and phase. The inventors have found that this allows more clear identification of features in the image data set 104 that match the known feature of interest 106 in the target data set 102. Thus, at block 212 a Hilbert transform is calculated of the real target data to form a complex target data set, viz., $$t(x,y,z) \leftarrow t(x,y,z) + iH_t[t(x,y,z)],$$

where $H_t$ denotes the usual Hilbert transform $$\mathcal{H}_t[g(\vec{r})] = \frac{1}{\pi} P \int d\vec{r}' \frac{g(\vec{r}')}{\vec{r}' - \vec{r}}.$$

Similarly, at block 216, a Hilbert transform is calculated of the real image data to form a complex image data set, viz., $$f(x,y,z) \leftarrow f(x,y,z) + iH_t[f(x,y,z)].$$

The subvolume that is used for initial calculations of the cross-correlation is selected by an operator so that an instruction identifying that subvolume is received at block 220. Any of the methods previously mentioned may be used by the operator to identify the subvolume, such as by providing a trace to identify a region that encloses the feature of interest 106. In some instances, software may assist in the identification so that the trace provided by the operator is translated into a standardized subvolume shape. In some embodiments, the identified subvolume is normalized as indicated at block 224:

$$t'(x, y, z) = \frac{t(x, y, z) - \bar{t}}{\sqrt{\sum_{x,y,z}[t(x, y, z) - \bar{t}]^2}},$$

where $\bar{t}$ is the average value of the target data t within the identified subvolume. There are a number of benefits provided by such normalization in embodiments where it is used. For instance, in cases where the subvolume remains un-normalized, results of the subsequent cross-correlation calculations may be dependent on the size of the feature of interest 106. In such cases, the identification of similar features in the image data set 104 may be complicated by spikes or local amplitude changes in the cross-correlation calculations. There are, moreover, instances where the identification of similar features may fail spuriously if no normalization is performed, such as in certain cases where the image energy varies with position.

With the subvolume identified, the method may proceed by calculating cross-correlations about each of a plurality of positions within the image data set. In some embodiments, there may be an interactive process in which the operator will initiate modifications to the subvolume based on results of the cross-correlation calculations, such as by changing the size and/or shape of the subvolume. Depending on the specific characteristics of the target and image data sets, and the possible features within them, the size of the subvolume that provides the most useful information may vary. Small subvolumes will tend to produce larger numbers of matching features while large subvolumes will tend to provide smaller numbers of matching features. This may be illustrated by considering the limiting cases where the subvolume is a point and where the subvolume is equal to the entire data set. When the subvolume is a point, the cross-correlation calculations will simply remap the image data set producing an identity; when the subvolume is equal to the entire data set, the cross-correlation will simply produce a spike at the origin. In either of these limiting cases, the cross-correlation calculations provide no additional information, illustrating the desirability to have an intermediate subvolume size.

Accordingly, it may be more efficient in some embodiments for initial cross-correlations to be performed only over a specified subset of the image data set 104 until the operator has determined the desired size for the subvolume. For example, in some embodiments, a plane within the image data set 104 may be selected, corresponding to a crossline, inline, or timeslice section, or a planar slice of any orientation within the image dataset. At block 228, an initial point (u, v, w) is selected within the specified subset of the image data set. The cross-correlation is then calculated about the selected point at block 232, with the cross-correlation being a complex cross-correlation in embodiments where the Hilbert transforms have been calculated:

$$F(u, v, w) = \frac{\sum_{x,y,z}[f(x, y, z) - f(u, v, w)][t'(x - u, y - v, z - w)]}{\sqrt{\sum_{x,y,z}[f(x, y, z) - f(u, v, w)]^2}}.$$

This process is repeated as indicated at blocks 236 and 240 until the cross-correlation value has been calculated at each of the plurality of positions identified within the specified subset. At that point an amplitude envelope $$A = \sqrt{(ReF)^2 + (ImF)^2}$$

may be calculated from the cross-correlation at block 248 and an instantaneous phase $$\varphi = \tan^{-1} \frac{ImF}{ReF}$$

calculated at block 244. The phase may be unwrapped at block 252 and the amplitude and phase results displayed to the user at block 256.

There are a variety of ways in which the amplitude and phase results may be displayed, including both in textual and graphical form. A graphical format may advantageously use color coding to render contrasting amplitude values that indicate features in common between the subvolume of the target data set 102 and the image data set 104. The operator may consider the display and input a modification of the subvolume, as checked at block 260, to prompt a recalculation of the results with the modified subvolume. Usually, such a modification will consist of changing the size of the subvolume without changing its shape, but in other embodiments shape changes may also be introduced. In this way, operator interactivity may be used to converge towards a subvolume size and/or shape that is especially suitable for a given investigation. The fact that smaller subvolumes produce larger numbers of matching features may be exploited during such interactivity. As the subvolume size is increased, the number of highly contrasting amplitude values in the graphical display is reduced, effectively causing matching features to "pop out" in the display. The evaluation required by an operator is thus greatly simplified since the method inherently allows the operator merely to examine the display for high-amplitude events. It is generally expected that experienced operators will be able to rely on past investigations to make efficient assessments of the data and thereby quickly determine the desired size of the subvolume.

Once the operator has decided on a particular subvolume size, the cross-correlation calculations may be performed for the entire image data set 104 in a non-interactive mode at block 264. The final results may then be rendered in a format suitable for multidimensional analysis, such as through use of three-dimensional viewing systems for three-dimensional data sets. The rendering of the final results is suitable for study by a geophysicist to identify high-amplitude values within the image data set 104 that indicate the presence of features similar to the known feature of interest.

While the above discussion has focused on an interactive process that uses only a subset of the image data set 104, it is of course possible for such interactivity to be performed on cross-correlation calculations for the entire image data set 104. This is particularly true in embodiments that provide fast processing and sophisticated multidimensional rendering tools. Furthermore, even in embodiments where a subset is used as described, still further calculations might still sometimes be performed after analysis of the results produced at block 264. For example, while the interactive analysis on a subset may provide a good determination of a desired subvolume size, the later analysis on the full set of results may suggest a further modification of the subvolume size to enhance or reduce certain characteristics identified in the results.

Figure 3:
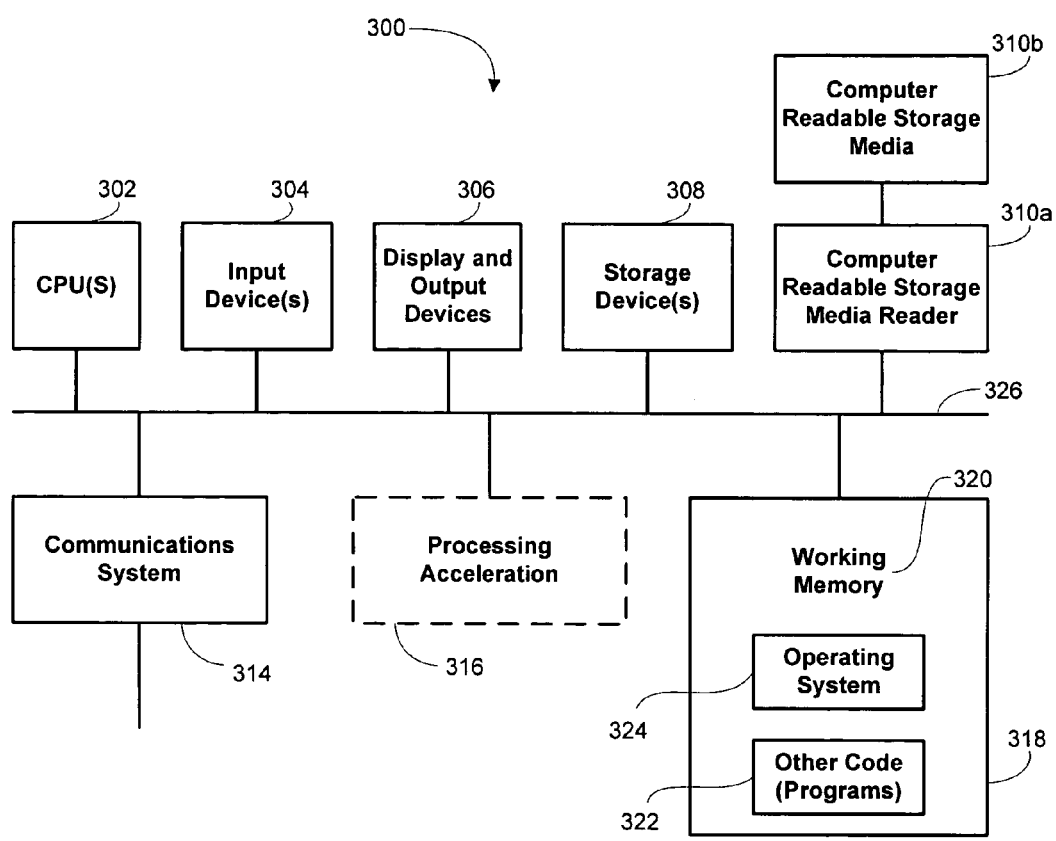
FIG. 3 provides a schematic illustration of a computer system on which methods of the invention may be embodied.

The methods of FIG. 2 may be performed with any suitably programmed computational device, an exemplary structure of which is provided in FIG. 3. This figure broadly illustrates how individual system elements of such a computational device 300 may be implemented in a separated or more integrated manner. The computational device 300 is shown comprised of hardware elements that are electrically coupled via bus 326, including a processor 302, an input device 304, a display or other output device 306, a storage device 308, a computer-readable storage media reader 310*a*, a communications system 314, a processing acceleration unit 316 such as a DSP or special-purpose processor, and a memory 318. The computer-readable storage media reader 310*a* is further connected to a computer-readable storage medium 310*b*, the combination comprehensively representing remote, local, fixed, and/or removable storage devices plus storage media for temporarily and/or more permanently containing computer-readable information. The communications system 314 may comprise a wired, wireless, modem, and/or other type of interfacing connection.

The computational device 300 also comprises software elements, shown as being currently located within working memory 320, including an operating system 324 and other code 322, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

While the above is a complete description of specific embodiments of the invention, it should not be taken as limiting the scope of the invention, which is defined in the following claims.

What is claimed is:

1. A method for investigating an image set of geophysical data distributed over a first N-dimensional volume where $N \geq 2$ using a computer system that includes an input device, a processor, and a display device, the method comprising:

receiving, with the input device, the image set of geophysical data and a target set of geophysical data distributed over a second N-dimensional volume;

selecting, with the processor, a subvolume of the target set of geophysical data, the subvolume enclosing a known feature of interest;

at each of a plurality of positions within the first N-dimensional volume, calculating, with the processor, a cross-correlation between the data distributed within the subvolume and corresponding data distributed in the first N-dimensional volume about the each of the plurality of positions; and displaying for a user on the display device a distribution of results of calculating the cross-correlation throughout the first N-dimensional volume.

2. The method recited in claim 1 further comprising:

modifying the subvolume in accordance with a user instruction; and at each of a plurality of positions within the first N-dimensional volume, calculating a cross-correlation between the data distributed within the modified subvolume and corresponding data distributed in the first N-dimensional volume about the each of the plurality of positions.

3. The method recited in claim 2 wherein modifying the subvolume comprises changing a size of the subvolume.

4. The method recited in claim 2 wherein modifying the subvolume comprises changing a shape of the subvolume.

5. The method recited in claim 1 wherein:
   each of the image set and the target set consists of real data, the method further comprising respectively transforming the real data of the image and target sets to complex data by performing a Hilbert transform of the real data; and
   calculating the cross-correlation comprises calculating a complex cross-correlation between the transformed data distributed within the subvolume and corresponding transformed data distributed in the first N-dimensional volume about the each of the plurality of positions.

6. The method recited in claim 5 further comprising calculating an amplitude envelope and phase distribution from the complex cross-correlation over the first N-dimensional volume.

7. The method recited in claim 1 wherein:
   each of the image set and the target set consists of real data; and calculating the cross-correlation comprises calculating a real cross-correlation.

8. The method recited in claim 1 further comprising normalizing the data distributed within the subvolume over the subvolume prior to calculating the cross-correlation.

9. The method recited in claim 1 wherein N=3.

10. The method recited in claim 1 wherein N=4.

11. The method recited in claim 1 wherein the image and target sets comprise seismic data.

12. The method recited in claim 1 wherein the image and target sets comprise mathematical transforms of seismic data.

13. The method recited in claim 1 wherein the image and target sets comprise prestack data.

14. The method recited in claim 1 wherein the image set is the target set.

15. The method recited in claim 1 wherein the subvolume is a parallelepiped.

16. A method for investigating an image set of real geophysical data distributed over a first N-dimensional volume where N≧2 according to a known feature of interest identified in a target set of real geophysical data distributed over a second N-dimensional volume using a computer system that includes an input device, a processor, and a display device, the method comprising:
   receiving, with the input device, the image set of real geophysical data and the target set of real geophysical data;
   transforming, with the processor the real geophysical data of the first N-dimensional volume to complex data by performing a Hilbert transform on the real geophysical data of the first N-dimensional volume;
   transforming with the processor, the real geophysical data of the second N-dimensional volume to complex data by performing a Hilbert transform on the real geophysical data of the second N-dimensional volume;
   selecting a subvolume with the processor, of the target set that encloses the known feature of interest in accordance with a user instruction;
   at each of a plurality of positions within the first N-dimensional volume, calculating, with the processor, a complex cross-correlation between the transformed data within the subvolume and corresponding transformed data distributed in the first N-dimensional volume about the each of the plurality of positions; and
   displaying for a user on the display device a distribution of results of calculating the complex cross-correlation throughout the first N-dimensional volume.

17. The method recited in claim 16 further comprising:
   modifying the subvolume in accordance with another user instruction; and
   at each of a plurality of positions within the first N-dimensional volume, calculating a complex cross-correlation between the transformed data within the modified subvolume and corresponding transformed data distributed in the first N-dimensional volume about the each of the plurality of positions.

18. The method recited in claim 16 further comprising normalizing the transformed data distributed within the subvolume over the subvolume prior to calculating the complex cross-correlation.

19. The method recited in claim 16 wherein the image set is the target set.

20. A computer-readable storage medium having a computer-readable program embodied therein for directing operation of a computer system including an input device, a processor, and a display device, wherein the computer-readable program includes instructions for operating the computer system for investigating geophysical data in accordance with the following:
   receiving, with the input device, an image set of geophysical data distributed over a first N-dimensional volume where N≧2;
   receiving, with the input device, a target set of geophysical data distributed over a second N-dimensional volume;
   receiving, with the input device, a first user instruction identifying a subvolume of the target set that encloses a known feature of interest; and
   calculating, with the processor at each of a plurality of positions within the first N-dimensional volume, a cross-correlation between the data distributed within the subvolume and corresponding data distributed in the first N-dimensional volume about the each of the plurality of positions.

21. The computer-readable storage medium recited in claim 20 wherein the computer-readably program further includes instructions for displaying, for a user with the display device, a distribution of results of calculating the cross-correlation throughout the first N-dimensional volume.

22. The computer-readable storage medium recited in claim 20 wherein the computer-readable program further includes:
   instructions for receiving, with the input device, a second user instruction to modify the subvolume; and
   instructions for calculating, with the processor at each of a plurality of positions within the first N-dimensional volume, a cross-correlation between the data distributed within modified subvolume and corresponding data distributed in the first N-dimensional volume about the each of the plurality of positions.

23. The computer-readable storage medium recited in claim 20 wherein:
   each of the image set and the target set consists of real data, the computer-readable program further including instructions for respectively transforming the real data of the image and target sets to complex data by performing a Hilbert transform of the real data; and
   the instructions for calculating the cross-correlation comprise instructions for calculating a complex cross-correlation between the transformed data distributed within the subvolume and corresponding transformed data distributed in the first N-dimensional volume about the each of the plurality of positions.

24. The computer-readable storage medium recited in claim 23 wherein the computer-readable program further includes instructions for calculating an amplitude envelope and phase distribution from the complex cross-correlation over the first N-dimensional volume.

25. The computer-readable storage medium recited in claim 20 wherein the computer-readable program further includes instructions for normalizing, with the processor, the data distributed within the subvolume prior to calculating the cross-correlation.

* * * * *